United States Patent [19]

Vandiver

[11] Patent Number: 5,655,706
[45] Date of Patent: Aug. 12, 1997

[54] REUSABLE TOP FOR USE WITH A DISPOSABLE STORAGE CONTAINER

[76] Inventor: Barry W. Vandiver, 103 Cactus Ct., Lenoir, N.C. 28645

[21] Appl. No.: 457,385

[22] Filed: Jun. 1, 1995

Related U.S. Application Data

[63] Continuation-in-part of Ser. No. 140,369, Oct. 21, 1993, abandoned.

[51] Int. Cl.⁶ .................................................... B65D 5/66
[52] U.S. Cl. .................... 229/125.09; 220/337; 220/787; 229/125.13
[58] Field of Search .................................. 220/305, 337, 220/342, 343, 787, 788, 789; 229/125.09, 125.11, 125.13

[56] References Cited

U.S. PATENT DOCUMENTS

| | | | |
|---|---|---|---|
| 1,645,429 | 10/1927 | Kenyon | 229/125.11 |
| 1,745,101 | 1/1930 | Labembarde | 229/125.09 |
| 2,282,150 | 5/1942 | Andary | |
| 2,506,820 | 5/1950 | Webb | |
| 3,326,408 | 6/1967 | Ringlen | 220/787 |
| 3,458,110 | 7/1969 | Goldman | |
| 3,944,127 | 3/1976 | Bruke et al. | |
| 3,954,179 | 5/1976 | Warmath | 220/337 |
| 4,008,846 | 2/1977 | Gordon | 229/4.5 |
| 4,018,235 | 4/1977 | Smith | 131/236 |
| 4,209,107 | 6/1980 | Crisci | 220/306 |
| 4,226,456 | 10/1980 | Barnett | 294/1 B |
| 4,242,983 | 1/1981 | Moore | 119/23 |
| 4,293,079 | 10/1981 | Lytle | 220/306 |
| 4,491,252 | 1/1985 | Schmidt et al. | 222/531 |
| 4,538,731 | 9/1985 | Cillario | 206/540 |
| 4,699,292 | 10/1987 | Farrell | 220/344 |
| 4,771,936 | 9/1988 | Dolby | 229/123.1 |
| 4,892,247 | 1/1990 | Dirksing et al. | 229/125.26 |
| 4,940,191 | 7/1990 | Dolby | 229/125 |
| 4,946,064 | 8/1990 | Vancucha | 220/355 |
| 5,050,763 | 9/1991 | Christensson | 220/355 |
| 5,083,701 | 1/1992 | Passamoni | 229/125.08 |
| 5,204,130 | 4/1993 | McDevitt et al. | 426/115 |
| 5,211,305 | 5/1993 | Horton | 220/461 |

*Primary Examiner*—Gary E. Elkins
*Attorney, Agent, or Firm*—Ralph H. Dougherty

[57] ABSTRACT

An improved method and apparatus for the disposal of noxious and hot kitchen waste using a reusable, sealable top structure detachably fixed in a discarded paper half-gallon consumer grade liquid container. Once the carton has been emptied of the milk or juice, it is prepared by removing two extended tabs and slightly trimming a third side, thus giving the carton a uniform upper edge. A top is provided to seal the odors in. The top has a lip that wraps around the top carton on all sides providing a seal between the carton and the top structure. The body of the top acts to hold the carton open for the insertion of scrap material. The body has a lid connected thereto by a hinge providing a trap-door to seal in the odors. This lid preferably has an o-ring wrapped around its periphery providing a seal between the lid and the insert. The lid is further provided with a handle or knob to facilitate its opening and closing.

7 Claims, 7 Drawing Sheets

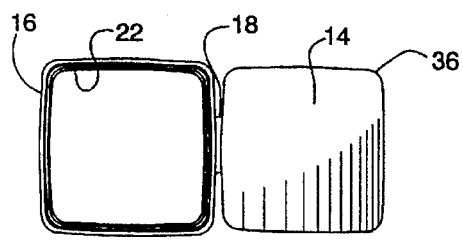
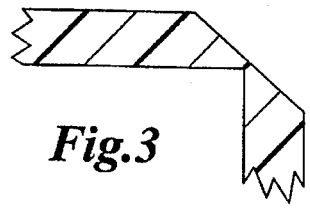
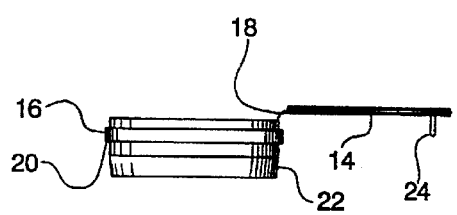
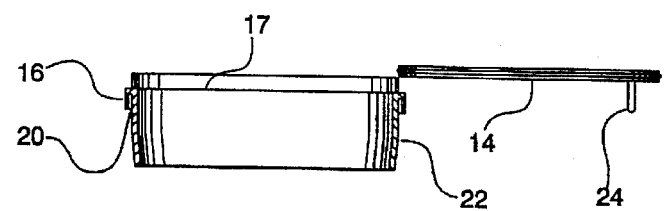
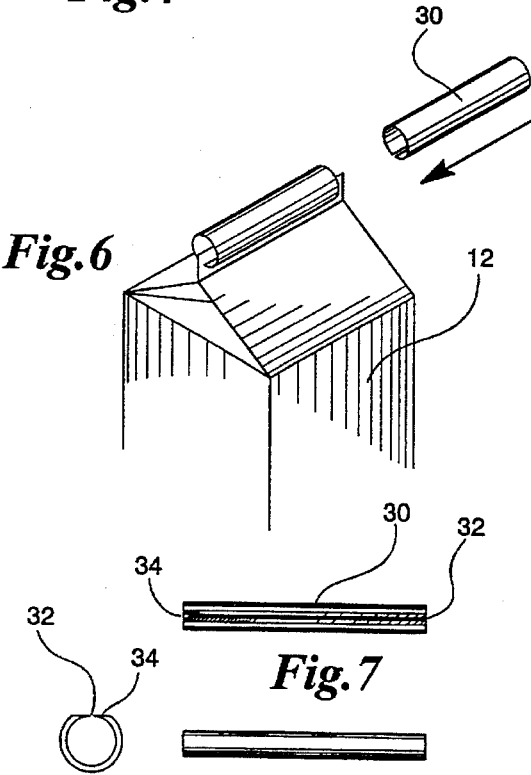
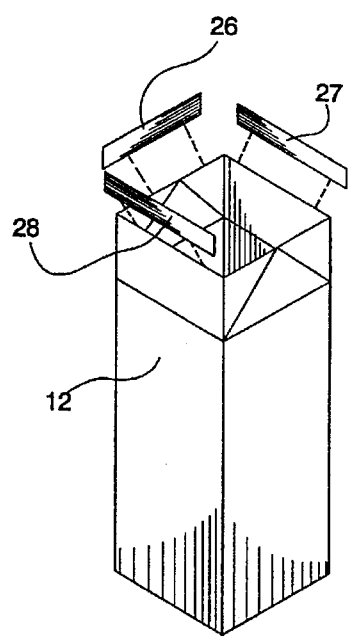

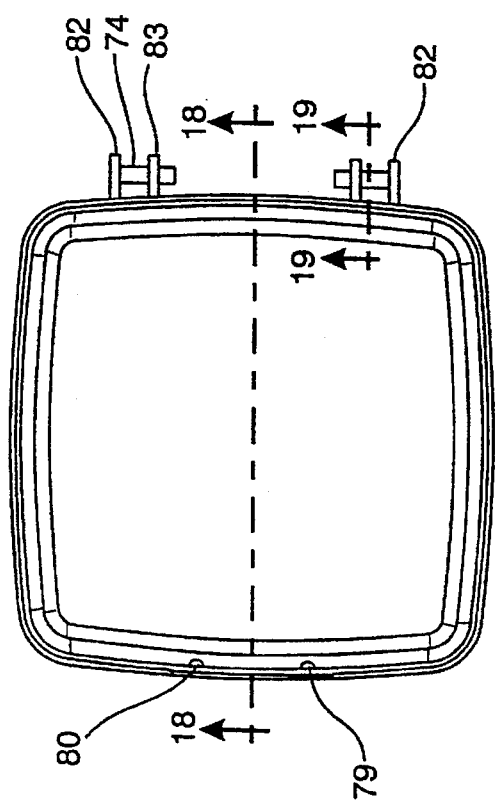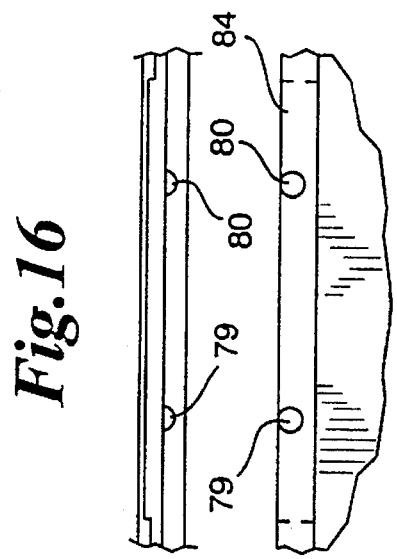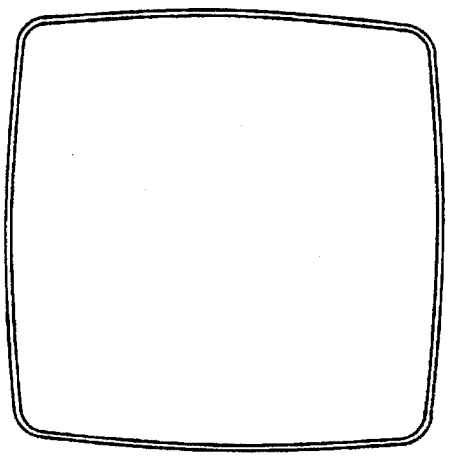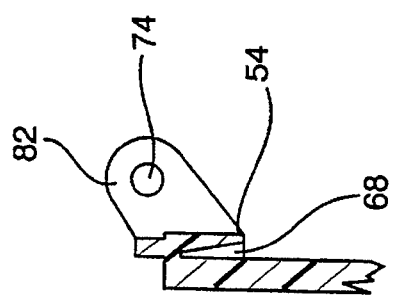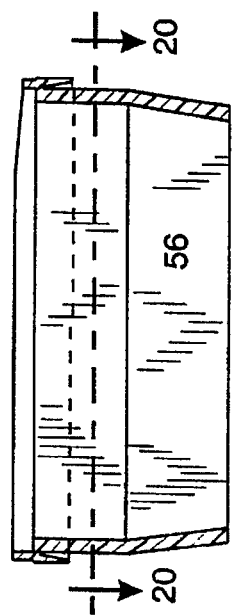

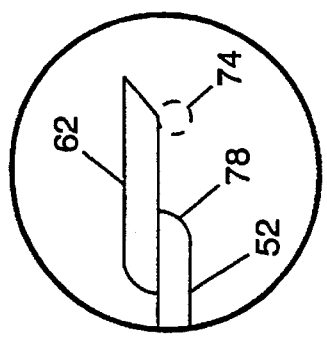
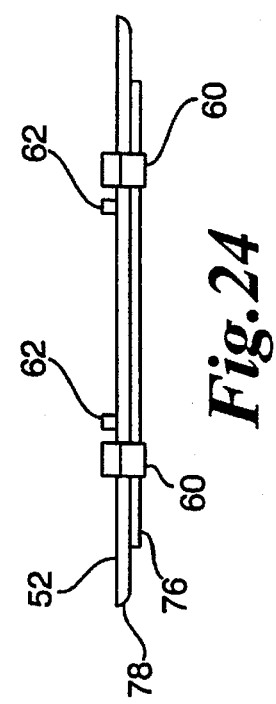
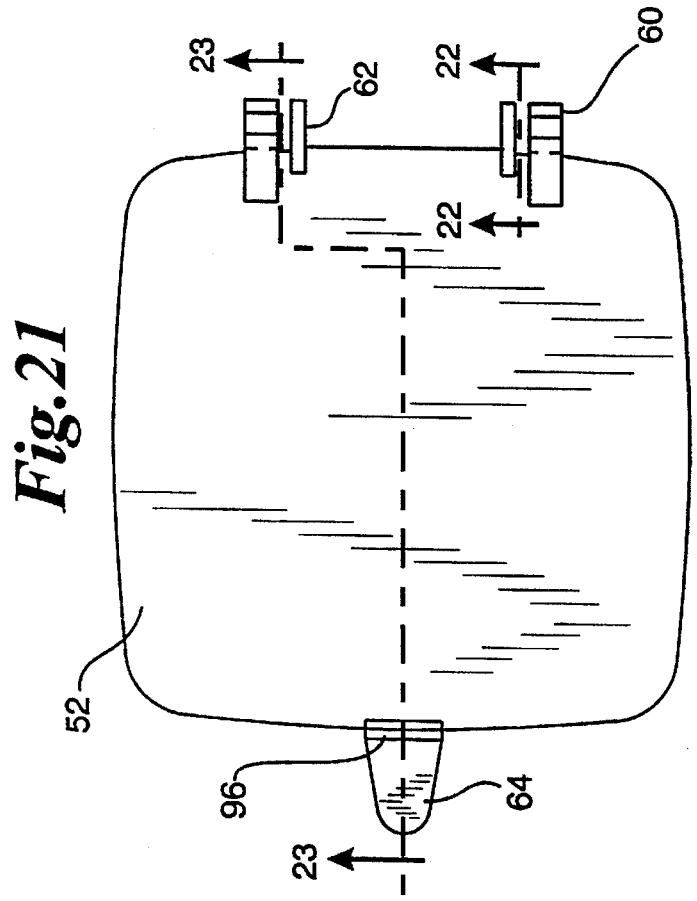
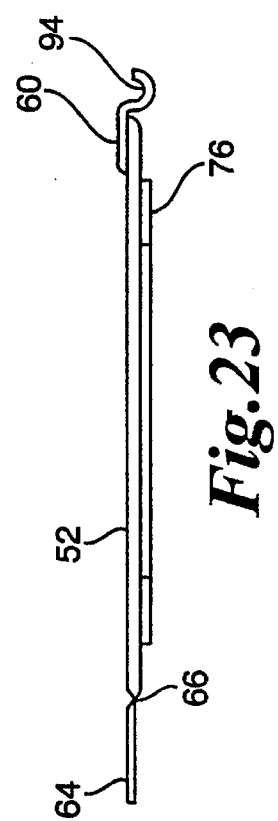

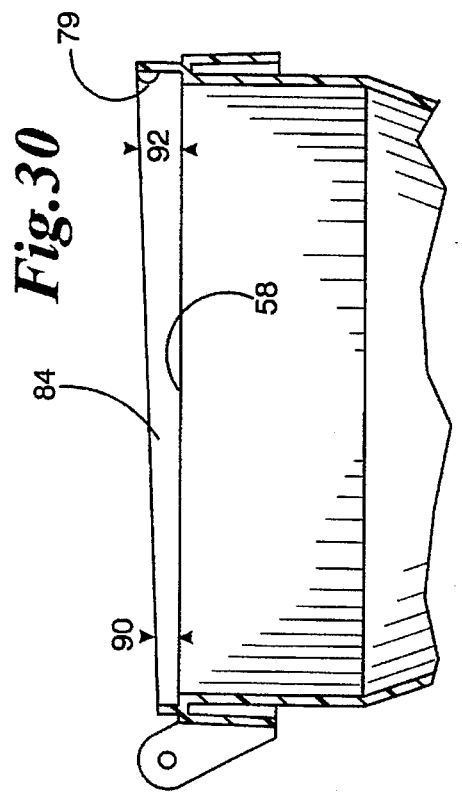
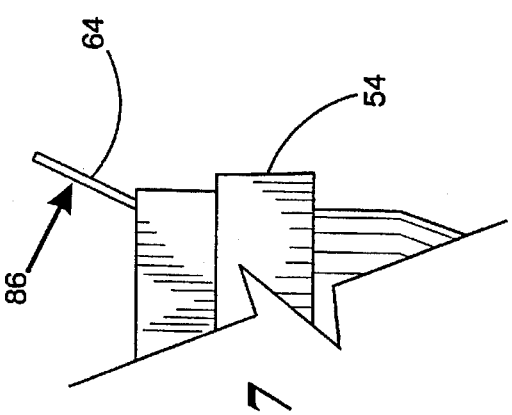
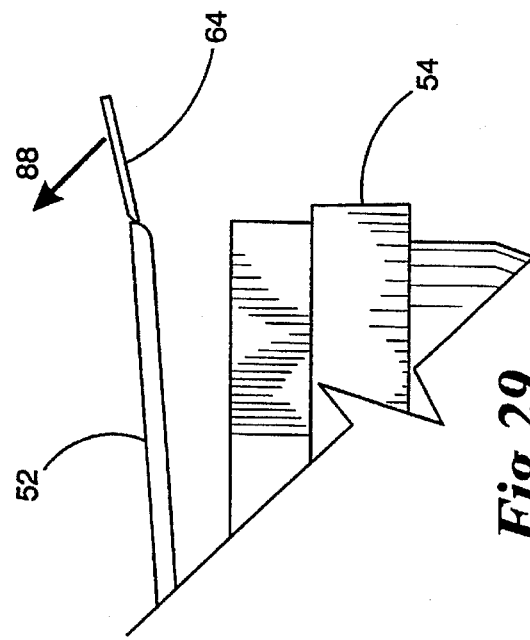
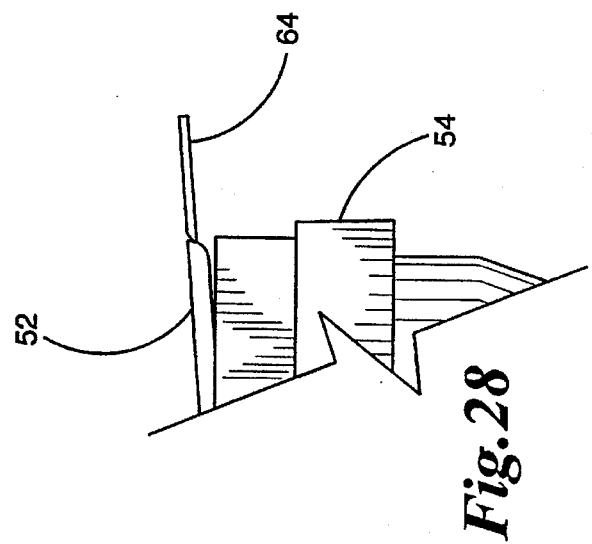

REUSABLE TOP FOR USE WITH A DISPOSABLE STORAGE CONTAINER

CROSS REFERENCE TO RELATED APPLICATION

This application is a continuation-in-part of my U.S. patent application Ser. No. 08/140,369, filed Oct. 21, 1993, abandoned.

FIELD OF THE INVENTION

The present invention relates to a method and apparatus for the safe disposal of liquids or wet scrap materials such as, coffee grounds, leftover table scraps, hot grease, and degradable food products.

BACKGROUND OF THE INVENTION

An important, and disconcerting problem repeatedly encountered by homemakers is the expedient disposition of food waste such as coffee grounds, scraps, hot grease, and bones. If such material is put into large trash bags with regular trash, there are problems with possible tears and leaks in the bags, and lingering odors prior to the bag being completely full. Further, hot grease must be put into containers capable of receiving and withstanding the heat of the grease without melting or deforming. Many homemakers use glass containers or discarded glass jars for this purpose. However, glass containers may crack from exposure to heated grease, or the container may break during transportation to the disposal site.

While there are several containers designed for handling some of the materials mentioned above, there exists no one container capable or suitable for the economical disposal of noxious and possibly hot waste items that are to be found in the kitchen.

It would be highly advantageous therefore, to provide one economical waste disposal system for handling each of the various refuse produced in the kitchen.

DESCRIPTION OF THE PRIOR ART

Applicant is aware of the following U.S. Patents concerning receptacles and odor-tight lid enclosures.

| U.S. Pat. No. | Issue Date | Inventor | Title |
|---|---|---|---|
| 2,282,150 | 05-05-1942 | Andary | OPENING AND DISPENSING DEVICE |
| 2,506,820 | 05-09-1950 | Webb | CLOSURE STRUCTURE |
| 3,458,110 | 07-28-1969 | Goldman | RECLOSABLE CONTAINER |
| 3,944,127 | 03-16-1976 | Bruke | DISPENSING CARTON HAVING A BAG-LIKE LINER |
| 4,008,846 | 02-22-1977 | Gordon | LEAKPROOF PAPERBOARD CONTAINER |
| 4,018,235 | 04-19-1977 | Smith | ASH TRAY |
| 4,209,107 | 06-24-1980 | Crisci | CONTAINER WITH VAPOR LOCK CLOSURE |
| 4,226,456 | 10-07-1980 | Barnett | CONTAINER AND CONTAINER LID |
| 4,242,983 | 01-06-1981 | Moore | BIRD NESTING BOX FORMED OF A DISPOSABLE STORAGE CONTAINER |
| 4,293,079 | 10-06-1981 | Lytle | HINGED CLOSURE |
| 4,491,252 | 01-01-1985 | Schmidt | DISPENSING DEVICE |
| 4,538,731 | 09-03-1985 | Cillario | CONTAINER FOR SMALL OBJECTS, PARTICULARLY PASTILLES AND SIMILAR CONFECTIONERY PRODUCTS |
| 4,699,292 | 10-13-1987 | Farrell | PULP BLEACHING TOWER PRESSURE RELIEF HATCH |
| 4,771,936 | 09-20-1988 | Dolby | BOX TOP LID |
| 4,892,247 | 01-09-1990 | Dirksing | PAPERBOARD CARTON WITH LATCHING PLASTIC LID |
| 4,940,191 | 07-10-1990 | Dolby | RECLOSEABLE BOX TOP LID |
| 4,946,064 | 08-07-1990 | VanCucha | SEALED CONTAINER |
| 5,050,763 | 09-24-1991 | Christensson | RECLOSING ARRANGEMENT FOR SQUARELY CROSS CUT CONTAINERS |
| 5,083,701 | 5,083,701 | Passamoni | FOLDED PAPERBOARD CONTAINER |
| 5,204,130 | 04-20-2010 | McDevitt | RECLOSEABLE CONTAINER FOR SLICED FOOD |
| 5,211,305 | 05-18-1993 | Horton | CARTON |

Andary U.S. Pat. No. 2,282,150, teaches a device which covers one end and both sides of a cereal box to protect the contents thereof from moisture.

Webb U.S. Pat. No. 2,506,820, teaches a device which fits over a bakery container constructed of cardboard or paperboard and grips said container to remain securely attached. The device allows easy access into the bakery container and securely closes after the removal of desired bakery goods.

Goldman U.S. Pat. No. 3,458,110, teaches a gable top container, such as a conventional plastic-coated paper container for milk, which is tightly reclosed by using a slit plastic tube as a clamp on the rib of the gable.

Bruke U.S. Pat. No. 3,944,127, teaches a device for securing dry or wet goods in a two-layer container. The outer layer consists of a substantially rigid material while the inner layer consists of a flexible material such as plastic. The two layers are fastened together in such a way that the outer layer may be easily separated from the inner layer once the container is emptied.

Gordon U.S. Pat. No. 4,008,846, teaches a sealing lid on a container of thermoplastic coated paperboard stock, such as is used in the manufacture of milk cartons.

Smith U.S. Pat. No. 4,018,235, mentions the use of suitably cut down empty milk cartons for use as ashtrays.

Crisci U.S. Pat. No. 4,209,107, teaches a container with closure, in which the container has an annular tapered ridge disposed below its upper edge and the closure has an inverted U-shaped groove with side walls sized and shaped to sealingly contact the container body at four surfaces. A vapor lock is created which tightly secures the container.

Barnett U.S. Pat. No. 4,226,456, teaches the accumulation of refuse, ranging from grease to dog feces, by means of a sealing plastic lid having an integral scoop in conjunction with a steel can.

Moore U.S. Pat. No. 4,242,983, teaches the use of a snap-on lid for an empty food stuff container to form a bird's nest.

Lytle U.S. Pat. No. 4,293,079, teaches an integrally formed closure assembly in which the lid is self hinged to the frame and includes a skirt wall to attach to a receptacle.

Schmidt U.S. Pat. No. 4,491,252, teaches a dispensing device which can easily attach to cereal boxes. The device aids in dispensing the contents of the attached cereal box and also provides a good seal against moisture pickup.

Cillario U.S. Pat. No. 4,538,731, teaches a device which fits on small containers and in which the closure element or stopper allows the snap-closing of the stopper without the use of excessive force.

Farrell U.S. Pat. No. 4,699,292, teaches a overflow hatch for confining low pressure volumes of paper pulp bleaching chemicals with a double O-ring seal arrangement.

Dolby U.S. Pat. No. 4,771,936, teaches a device with a gasket within for keeping insects out of the container of food stuffs and helping the food to stay fresh longer.

Dirksing U.S. Pat. No. 4,892,247, teaches a paperboard package with a latching plastic lid in which to keep dry goods.

Dolby U.S. Pat. No. 4,940,191, teaches a reclosable box top lid designed to frictionally lock in closed position and to be held fully open by hook and loop pile fasteners.

VanCucha U.S. Pat. No. 4,946,064, teaches a container assembly which can withstand large quantities of force such as when containers are stacked in multiple layers.

Christensson U.S. Pat. No. 5,050,763, teaches a reclosable lid frame which has a continuous downwardly open groove which attaches to the container and a sealing material to secure the lid frame to the container.

Passamoni U.S. Pat. No. 5,083,701, teaches a folder paperboard container which has an inner thermoplastic coating. The device is sealed to the container by heat sealing within the open end of the container.

McDevitt U.S. Pat. No. 5,204,130, teaches a recloseable container for storing sliced food products.

Horton U.S. Pat. No. 5,211,305, teaches a carton-type container which has a sift-proof inner liner. The lid is provided with a re-closable pour opening through which the product contained within the container can be repeatedly dispensed therefrom.

SUMMARY OF THE INVENTION

The invention provides a method and apparatus for the disposal of noxious and hot kitchen waste using a reusable, sealable top structure detachably fixed in a discarded paper half-gallon consumer grade liquid container.

In the preferred embodiment, the present invention enables a person to use a standard half-gallon cardboard milk or juice container to collect all food stuff and waste materials, whether hot or cold. It has been found that such a carton is capable of containing hot grease without significant deformation or degradation. Further, such a carton is typically found around the home and therefore provides a convenient and economical disposal receptacle.

Once the carton has been emptied of the milk or juice, it is prepared by trimming the carton to provide a uniform edge. This is usually done by removing two extended tabs and slightly trimming a third side. The invented top is then inserted onto the upper edge of the carton, the body of the invention being tapered to accomplish this. The invented top is provided with a lip that extends around the upper periphery of the insert. When the top is placed into the opening of the carton, the lip acts both as a stopping mechanism to prevent the top from falling or sliding into the carton, and as a seal between the carton and the top structure. The rigid body of the top acts to hold the carton open for the insertion of scrap material. To seal in the odors a lid is connected to the body by a hinge. The lid preferably has an O-ring around its periphery adapted to create a seal with the upper interior periphery of the insert, thus sealing in the odors. The lid is further provided with a handle or knob to facilitate its opening and closing.

Once the cardboard container is filled with waste, the user simply removes the invented top, re-folds the cardboard container, and seals the carton in preparation for transportation to a waste disposal site. To aid in sealing the full carton a clamping device is provided.

OBJECTS OF THE INVENTION

The principal object of the invention is to provide an improved method for the disposal of noxious and potentially harmful kitchen waste.

A further object of this invention is to provide an apparatus suitable for the economical disposal of noxious and potentially harmful kitchen waste.

It is another object of this invention to provide means for limiting or preventing the escape of odors from the interior of a kitchen waste container.

It is also an object of this invention to provide a fully sealable container for collection of kitchen wastes.

BRIEF DESCRIPTION OF THE DRAWINGS

The foregoing and other objects will become more readily apparent by referring to the following detailed description and the appended drawings in which:

FIG. 2 is a top view of the invented top.

FIG. 3 is a partial cross-sectional view of the "living hinge" embodiment of the hinge mechanism.

FIG. 4 is a side view of the invented top.

FIG. 5 is a cross-sectional view of the invented top.

FIG. 6 is an isometric view of a carton and the closure apparatus.

FIG. 7 is a bottom view of carton closure apparatus.

FIG. 8 is a side view of the carton closure apparatus.

FIG. 9 is a top view of the carton closure apparatus.

FIG. 10 is a isometric view of an open carton.

FIG. 15b is a top view of the lower half of the alternative embodiment of the invented top of FIG. 15a.

FIG. 16 is a top view of a partial cross-section of the top of the front lip showing the nibs of the embodiment of FIG. 15b.

FIG. 17 is a partial cross-section of the inside, front of the top showing the nibs of the embodiment of FIG. 15b.

FIG. 18 is a cross-section of the invented top of the embodiment of FIG. 15b.

FIG. 19 is a cross-section of the hinge apparatus of the embodiment of FIG. 15b.

FIG. 20 is a cross-section of the invented top of the embodiment of FIG. 18.

FIG. 21 is a top view of the top of the lid apparatus of the embodiment of FIG. 15a.

FIG. 22 is a partial cross-section of the hinge of the invented top of the embodiment of FIG. 21.

FIG. 23 is a side view of the lid of the embodiment of FIG. 21.

FIG. 24 is a rear view of the lid of the embodiment of FIG. 21.

FIG. 25 is a bottom view of the top of the lid apparatus of the embodiment of FIG. 15a.

FIG. 26 is a partial cross-section of the lid apparatus of the embodiment of FIG. 15a.

FIG. 27 is a partial side view of the lid apparatus of the embodiment of FIG. 15a, showing the lid in the closed position.

FIG. 28 is a partial side view of the lid apparatus of the embodiment of FIG. 27, showing the lid partially open.

FIG. 29 is a partial side view of the lid apparatus of the embodiment of FIG. 27, showing the lid in a more open position.

FIG. 30 is a cross sectional view of the lid apparatus of the embodiment of FIG. 15a, showing the elevational differences in the shelf.

DETAILED DESCRIPTION

Figure 1:
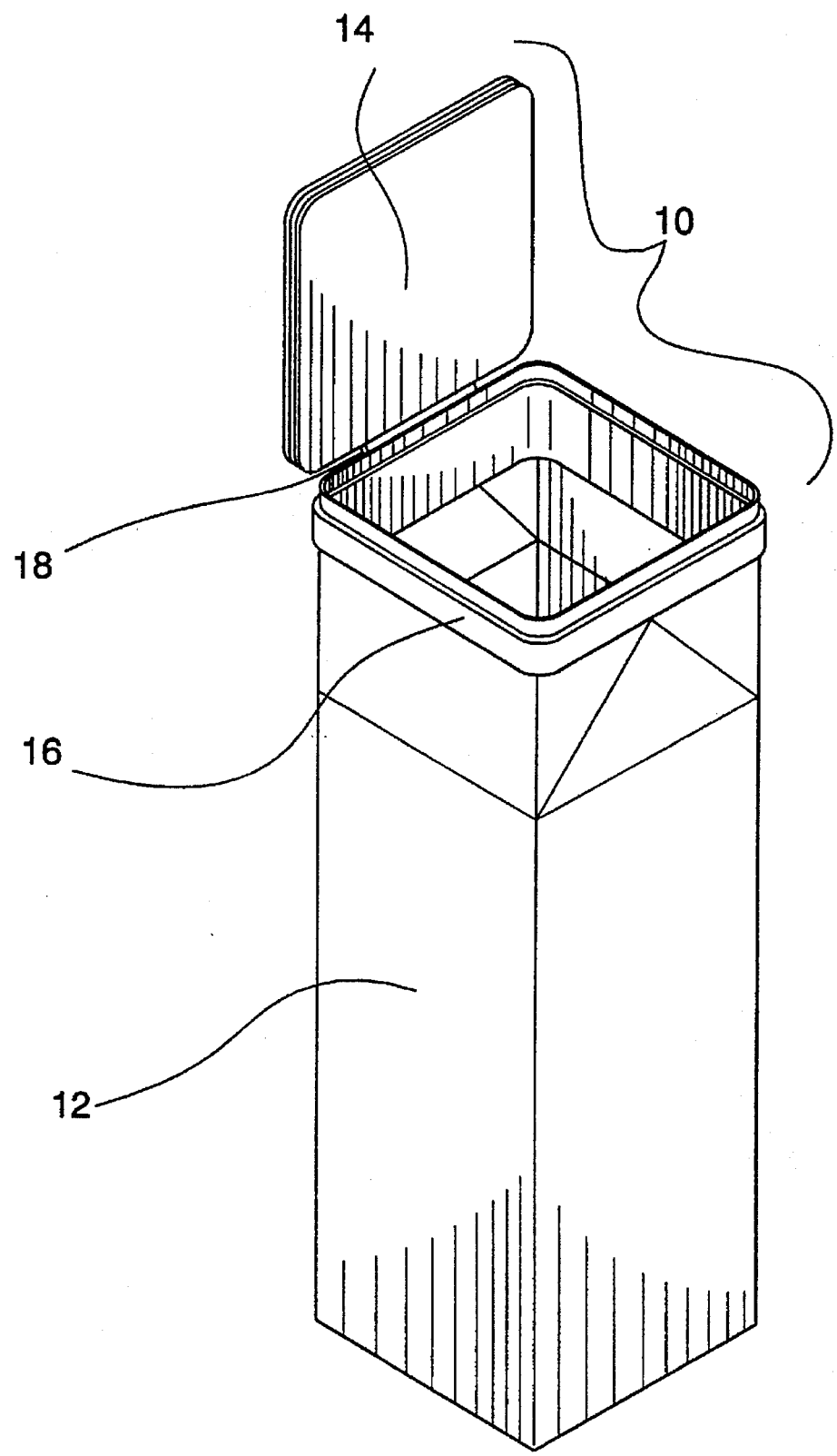
FIG. 1 is an isometric view illustrating the invented top in use on an empty carton.
Figure 12:
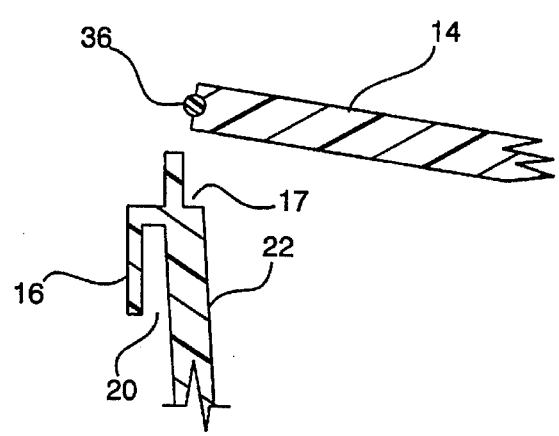
FIG. 12 is a partial cross-section of another alternative embodiment of the invented top.

Referring now to the drawings, and particularly to FIG. 1, the preferred embodiment of the invented reusable, removable top, indicated generally as 10, is comprised of two basic parts: insert 22 and lid 14. Insert 22 is tapered at its lower end for easy insertion into a properly prepared half-gallon carton. To provide a seal between the insert and the carton, outer lip 16 depends from the insert forming a groove adapted to accept the top edge of carton 12. Lid 14 and insert 22 are connected by "living hinge" 18. Living hinge 18 is shown in the cross-sectional in FIG. 3. Shelf 17 is molded into the insert to provide a stop for lid 14. Lid 14 has a handle 24 inserted therein to allow easy opening thereof. Looking at FIG. 12, in order to seal in the odors between uses, lid 14 is preferably fitted with flexible O-ring 36, which when closed is in contact with the interior of insert 22.

The invented top 10 is preferably made of a durable kitchen grade plastic. This allows the top to be washed in a dishwasher and reused. The carton is preferably made from thermoplastic coated paperboard stock, such as is currently used in milk cartons.

To aid in the resealing of carton 12 after it has been filled with refuge, sealer 30 has been provided. Sealer 30 is preferably constructed from round PVC piping by creating slit 32 throughout the length of it, grinding bevel 34 into one or both ends and lastly, flattening the flanges about slit 32. Thereafter, sealer 30 is appropriately adapted for sliding over and sealing the top of milk carton 12. Alternatively, sealer 30 could be constructed from a bio-degradable material to provide a more environmentally oriented product.

In operation, carton 12 is prepared by fully opening the glued edges of a standard milk or juice carton and cutting off three flanges 26, 27, and 28. This creates a even surface upon which the invented device will rest. Insert 22 of top 10 is inserted into the top of carton 12. The edges of the milk carton fit snugly into groove 20 formed between insert 22 and outer lip 16. Thereafter, kitchen waste, such as grease, liquids, meat or table scraps, are deposited into the milk carton by first opening trap door 14, and inserting the food through insert 22. Thereafter, door 14 is closed with the seal formed between O-ring 36 and the inside edge of insert 22 acting to keep odors in. Once the milk carton is filled, the lid apparatus is removed, and the user folds the carton top back to its original "shipped" configuration. Thereafter the user slides sealer 30 over the top of the milk carton as shown in FIG. 6.

ALTERNATIVE EMBODIMENTS

Figure 13:
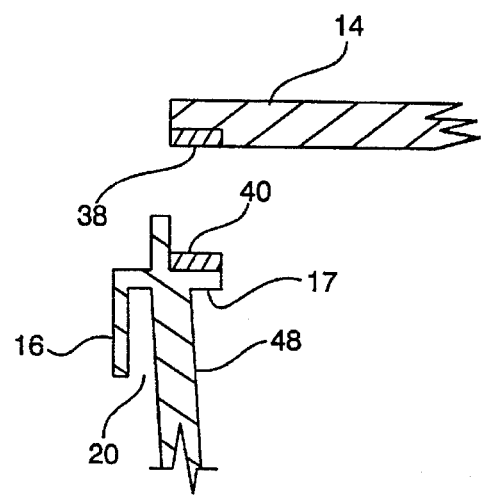
FIG. 13 is a partial cross-section of still another alternative embodiment of the invented top.

The seal between trap door 14 and insert 22 can be created in a variety of ways. As shown in FIG. 13, an annular metallic insert 38 can be placed around the underside of the perimeter of trap door 14. In conjunction, shelf 17 can be widened and an annular magnet 40 placed around the perimeter of insert 22. Metallic insert 38 and magnet 40 interact to produce the desired odor-proof seal.

Figure 11:
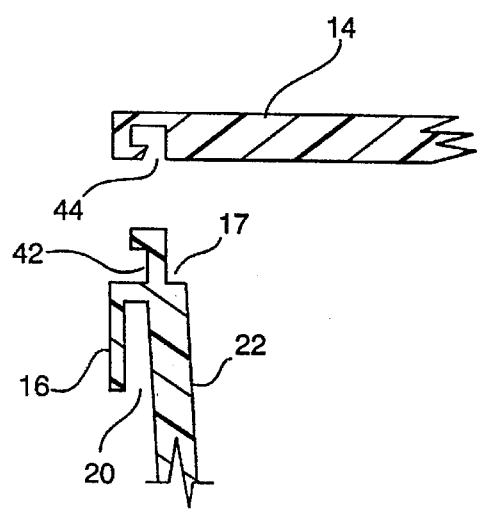
FIG. 11 is a partial cross-section of an alternative embodiment of the invented top.
Figure 14:
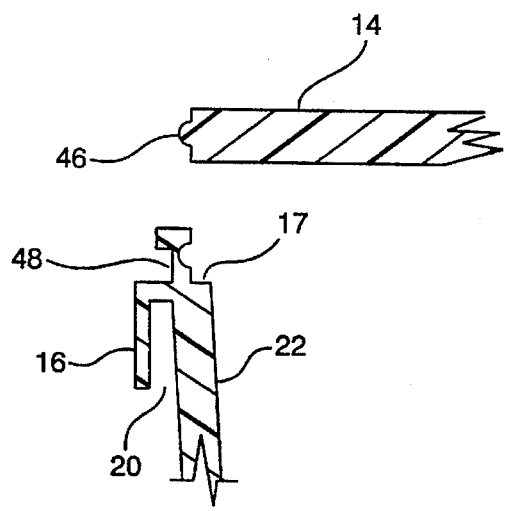
FIG. 14 is a partial cross-section of still another alternative embodiment of the invented top.

In another embodiment, shown in FIG. 11, a locking tab 42 can be formed on and upstanding from shelf 17, and a mating receiving groove 44 can be formed in lid 14. This forms a snap-tight seal preventing the escape of odors. Similarly, the lid can be fitted with a projection 46, as shown in FIG. 14, and shelf 17 provided with a female mating rail 48 which produce a snap-tight locking structure.

Further, the invented top can be constructed on a variety of scales to mate with other suitable containers capable of storing kitchen waste.

Figure 15A:
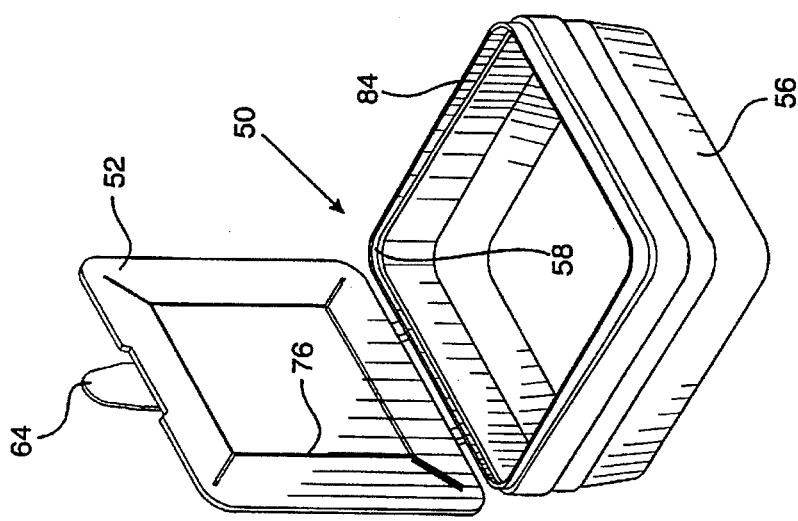
FIG. 15a is an isometric view of yet another alternative embodiment of the invented top with lid.

In yet another embodiment, shown in FIG. 15a, a locking top 52 can be formed on and upstanding from shelf 58. This forms a reusable, recloseable container lid structure adapted for insertion into a disposable container. The structure of this container, FIG. 15a, comprises an insert comprising a pair of opposite side walls, a front wall, and a rear wall defining a lower periphery. A upright edge 84 extending outwardly and upwardly about the upper periphery of the insert, and along the front, rear and side walls also makes up a part of lid. The front of the upright edge has an upper edge where a first nib 79 and second nib 80 spaced apart are located. A lid 52 is another important part of this apparatus which includes a periphery. The lid 52 has a tapered edge 78 configured to fit snugly between the upright edge 84 and the shelf 58. A hinge is provided which supports the lid on the insert for pivotal movement between an open position and a closed position, this hinge being connected to the rear wall.

In the embodiment shown in FIG. 15a, the hinge is made up of a first hinge base 82, FIG. 19, which can be molded on the outside of the rear wall of the insert fitting. A second hinge base 83, FIG. 15b, is spaced apart and generally parallel the hinge base 82. A tubular member or axle 74 spans the distance from the first hinge base 82 to the second hinge base 83 and extends out a distance from the second hinge base 83. The tubular member can be a separate piece or part of a mold. Lid 52 has a top and a rear edge. Projecting from this top and rear edge is a hinge retaining bottom 60 and a hinge override member 62. The hinge retaining member 60, FIG. 24, has a channel 94, FIG. 23, adaptable for rotational, sliding engagement of tubular member 74 between the first hinge base 82 and the second hinge base 83.

Hinge override member 62, FIG. 22, abuts tubular member 74 extending beyond second hinge base 83 for rotational, sliding engagement.

Figure 25:
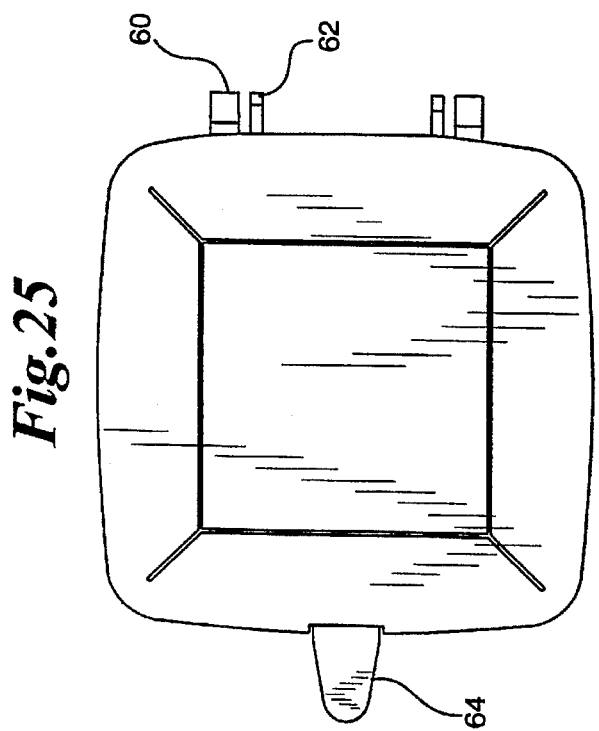
Figure 26:
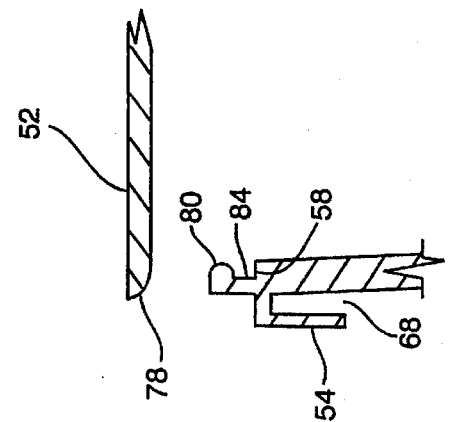

The reusable, recloseable container lid structure further comprises a pair of opposed side edges in the lid, a rear edge, and a front edge. A flexible tab 64, FIG. 25, is affixed from substantially the center of at least a proportion of the front edge of the lid 52, between the nibs 79 and 80 which are attached to front wall of insert 56. This tab 64, FIG. 21, is provided with a notch 96 parallel to the front edge of the lid adapted to allow the tab to be flexed at least 90 degrees, FIG. 27.

As shown in FIG. 27, tab 64 is almost perpendicular to lid 52. In operation the user exerts a force 86 on tab 64, which forces the front of lid 52, FIG. 28, up past nibs 79 and 80 and slightly askew. A force 88, FIG. 29, can then be applied to lid 52 so that it swings back on its hinges allowing the user access to the disposable container.

The entire reusable, recloseable container lid structure is preferably made of plastic such as, but not limited to polypropylene (PP), polyethylene (PE), polyvinyl chloride (PVC), chlorinated polyvinyl chloride (CPVC), polyvinylidene fluoride (PVDF), ultra high molecular weight polyethylene (UHMW PE), ethylene chlorotrifluoroethylene (ECTFE), ethylene tetrafluoroethylene (ETFE), chlorotrifluoroethylene (CTFE), fluorinated ethylene propylene (FEP), perfluoroalkoxy (PFA), acrylonitrile-butadiene-styrene (ABS), fiberglass reinforced plastic (FRP), fiberglass reinforced vinyl ester, fiberglass reinforced epoxy, polyphenylene sulfide (PPS), polyphthalamide (PPA), fiberglass reinforced polyvinylchloride, fiberglass reinforced polyester, polyether ether ketone (PEEK), or polysulfone.

This reusable, recloseable container lid is used in conjunction with a disposable container. When the container is full a device for sealing 30, FIG. 6, the disposable container 12 is provide for use after the container lid structure is removed from the container. The sealing means 30 may be a tubular member being provided with a longitudinal slit 32, FIG. 8.

The flexible sealing device or O-ring 36 can be made of rubber or a soft plastic such as an elastomer. Suitable materials for the sealing device include but are not limited to rubber, Buna-N rubber, neoprene, VITON™, SANIPRENE™, TEFLON™, a soft plastic such as an elastomer, polytetrafluorethylene (PTFE), nitrile rubber (NBR), ethylene propylene rubber (EPDM), butyl rubber, chloroprene rubber (CR), fluorine rubber (FPM), chlorine sulphonyl polyethylene (CSM), per fluoro (ethylenepropylene) copolymer (FEP), and ethylene/chlorotrifluoroethylene copolymer (ECTFE).

In addition, other known hinges can be utilized in place of the "living hinge" as long as they are capable of allowing the lid to form a seal with the insert.

SUMMARY OF THE ACHIEVEMENT OF THE OBJECTS OF THE INVENTION

From the foregoing, it is readily apparent that I have invented an improved method for the disposal of noxious and potentially harmful kitchen waste, and an improved apparatus for the economical disposal of noxious and potentially harmful kitchen waste.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A reusable, recloseable container lid structure adapted for insertion into a disposable container, said structure comprising:

an insert comprising a pair of opposite side walls, a front wall, and a rear wall defining a lower periphery;

an upright edge extending outwardly and upwardly about the upper periphery of said insert, along said front, rear and side walls;

said front of said upright edge having an upper edge;

a first and second nib spaced apart along said upper edge of said front of said lip;

a lid having a periphery and an underside, said lid having a tapered edge configured to fit snugly in said lip and a front edge; and a hinge supporting said lid on said insert for pivotal movement between an open position and a closed position, said hinge being connected to said rear wall.

2. An apparatus according to claim 1, further comprising:

said lid having a pair of opposed side edges, a rear edge, and a front edge;

a flexible tab depending from substantially the center of at least a proportion of said front edge of said lid, between said nibs; and said tab being provided with a notch parallel to the front edge of said lid adapted to allow said tab to be flexed at least 90 degrees.

3. An apparatus according to claim 1, wherein said reusable, recloseable container lid is made of a material selected from the group consisting of: polypropylene (PP), polyethylene (PE), polyvinyl chloride (PVC), chlorinated polyvinyl chloride (CPVC), polyvinylidene fluoride (PVDF), ultra high molecular weight polyethylene (UHMW PE), ethylene chlorotrifluoroethylene (ECTFE), ethylene tetrafluoroethylene (ETFE), chlorotrifluoroethylene (CTFE), fluorinated ethylene propylene (FEP), perfluoroalkoxy (PFA), acrylonitrile-butadiene-styrene (ABS), fiberglass reinforced plastic (FRP), fiberglass reinforced vinyl ester, fiberglass reinforced epoxy, polyphenylene sulfide (PPS), polyphthalamide (PPA), fiberglass reinforced polyvinylchloride, fiberglass reinforced polyester, polyether ether ketone (PEEK), or polysulfone.

4. An apparatus according to claim 1, further comprising reinforcing ridges molded on said underside of said lid.

5. An apparatus according to claim 1, wherein said hinge comprises:

a first hinge base integral with said rear wall of said insert;

a second hinge base spaced apart and generally parallel to said first hinge base;

a tubular member substantially perpendicular to said first hinge base extending to, and beyond second hinge base;

said lid having a top and a rear edge;

a hinge retaining bottom integral with said top and said rear edge of said lid, extending beyond said lid having a channel;

a hinge override member spaced from and substantially parallel to said hinge retaining bottom, integral with said top and said rear edge of said lid, extending beyond said lid;

said channel of said hinge retaining bottom in rotational, sliding engagement of said tubular member between said first hinge base and said second hinge base; and said hinge override member abutting said tubular member for rotational, sliding engagement.

6. An apparatus according to claim 5, wherein said hinge further comprises:

said first hinge base having a first aperture;

said second hinge base having a second aperture; and a unitary tubular member journaled between said first aperture and said second aperture.

7. An apparatus according to claim 5, wherein said first hinge base, said second hinge base and said tubular member are all integrally molded.

* * * * *